United States Patent [19]

Pfitzenmaier et al.

[11] Patent Number: 5,491,115
[45] Date of Patent: Feb. 13, 1996

[54] COLORED GLASS-CERAMICS AND METHOD

[75] Inventors: Robert W. Pfitzenmaier, Canisteo; Charles C. Smith, Jr., Corning, both of N.Y.

[73] Assignee: Corning Incorporated, Corning, N.Y.

[21] Appl. No.: 276,307

[22] Filed: Jul. 18, 1994

[51] Int. Cl.$^6$ .......................... C03C 10/14; C03C 10/12
[52] U.S. Cl. ...................................... 501/4; 501/7; 501/69
[58] Field of Search ........................ 501/4, 7, 69

[56] References Cited

U.S. PATENT DOCUMENTS

| | | |
|---|---|---|
| 2,920,971 | 1/1960 | Stookey . |
| 4,940,674 | 7/1990 | Beall et al. ................................ 501/4 |
| 5,070,045 | 12/1991 | Comte et al. . |
| 5,179,045 | 1/1993 | Aitken et al. . |
| 5,256,600 | 10/1993 | Pfitzenmaier . |

*Primary Examiner*—Karl Group
*Attorney, Agent, or Firm*—Milton M. Peterson

[57] ABSTRACT

A colored glass-ceramic and method of making it. The glass-ceramic has a primary crystal phase selected from the group consisting of beta-quartz solid solution and beta-spodumene solid solution, containing an amount of $TiO_2$ effective as a nucleating agent up to 6% by weight, 700–900 ppm $Fe_2O_3$ and 550–3000 ppm $Co_3O_4$, the glass-ceramic having a beta-quartz solid solution as a primary crystal phase being transparent and having a color defined by the color coordinates x=0.2200–0.3100, y=0.0200–0.2400 falling within color box ABCDA in FIG. 1 in the drawings, and the glass-ceramic having a beta-spodumene solid solution as a primary crystal phase being opaque and having a color defined by the color coordinates x=0.2480–0.2880, y=0.2000–0.3150 falling within color box JKLMJ in FIG. 2 in the drawings. Reddish-purple and violet colors are obtained in transparent, beta-quartz glass-ceramics, while light to dark blue colors are obtained in opaque, beta-spodumene glass-ceramics.

14 Claims, 1 Drawing Sheet

COLORED GLASS-CERAMICS AND METHOD

RELATED APPLICATION

U.S. application Ser. No. 08/258,271, filed by S. L. Hagg, R. W. Pfitzenmaier, and C. C. Smith under the title CHAMPAGNE COLORED GLASS-CERAMICS and assigned to the same assignee as the present application, is directed to the production of transparent glass-ceramic articles exhibiting a champagne tint. A color package is disclosed that imparts a champagne tint in transparent glass-ceramic materials containing beta-quartz solid solution as the predominant crystal phase. The color package includes $Al_2O_3$, $Li_2O$, $Fe_2O_3$, and $Co_3O_4$ within restricted intervals.

FIELD OF THE INVENTION

The field is glass-ceramic materials and production of colors therein.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps:

1. Melting a mixture of raw materials, usually containing a nucleating agent, to produce a glass.
2. Forming an article from the glass and cooling the glass below its transformation range.
3. Crystallizing ("ceramming") the glass article by an appropriate thermal treatment.

The thermal treatment usually involves a nucleating step at a temperature slightly above the transformation range. This is followed by heating to a somewhat higher temperature to cause crystal growth on the nuclei.

Crystallization of glasses in the $Li_2O$—$Al_2O_3$—$SiO_2$ composition field generally provides highly crystallized glass-ceramics. The primary crystal phase may be a transparent beta-quartz solid solution, or an opaque beta-spodumene solid solution, depending on ceramming temperature.

Beta-quartz is the hexagonal trapezohedral modification of $SiO_2$. It exhibits a slightly negative coefficient of thermal expansion (CTE). This makes it of particular interest where thermal cycling occurs, as in cookware. The basis of the beta-quartz solid solution is believed to be the substitution of $Al^{+3}$ ions for some of the $Si^{+4}$ ions in the beta-quartz structure. The attendant charge deficiency is made up by the introduction of a small ion, such as $Li^+$, $Mg^{+2}$, or $Zn^{+2}$, into the beta-quartz structure.

Beta-quartz solid solution glass-ceramics customarily contain $TiO_2$ as a nucleating agent. Optionally, the $TiO_2$ may be partially, or wholly, substituted for by $ZrO_2$.

The appearance of such $Li_2O$—$Al_2O_3$—$SiO_2$ glass-ceramics can be varied by varying ceramming conditions, in particular heat treatment. Thus, transparent, translucent, or opaque glass-ceramics (which may be water-white, translucent, opaque white, or variously colored) are all possibilities.

The beta-quartz crystals in a transparent glass-ceramic are necessarily small in size. They are produced by ceramming the precursor glass at a relatively low temperature that normally does not exceed about 900° C. If the same glass is cerammed at a higher top temperature on the order of 1150° C., the opaque beta-spodumene crystal phase is produced. At such higher temperature, the small beta-quartz crystals convert to beta-spodumene and grow in size, thereby rendering the product opaque.

This flexibility is a very valuable attribute for at least two reasons. It permits producing both transparent and opaque ware from a single precursor glass. It also permits producing composition variants of the precursor glass, such as colorant variations, by using a forehearth additive system as later described in more detail. This facilitates producing more than one product from a single melting unit.

The widest use of $Li_2O$—$Al_2O_3$—$SiO_2$ glass-ceramic materials has been in the field of culinary ware. For over three decades, Corning Glass Works, now Corning Incorporated, has marketed opaque white cooking utensils under the trademark CORNING WARE.

More recently, cooking utensils, formed from a transparent glass-ceramic exhibiting a light brown tint, were introduced commercially under the trademark VISIONS. In general, this transparent glass-ceramic is crystallized at lower temperatures to develop small, beta-quartz solid solution crystals.

It has been observed that transparent, beta-quartz glass-ceramics nucleated with $TiO_2$ tend to exhibit a light brown tint. This is ascribed to the presence of both $TiO_2$ and $Fe_2O_3$ in the parent glass composition. Efforts to achieve a different color, then, must take into consideration this inherent coloration effect.

U.S. Pat. No. 5,070,045 (Comte et al.) discloses transparent, glass-ceramic plates wherein the predominant crystal phase in the glass-ceramics is beta-quartz solid solution. These plates use 0.1–1.0% of a colorant selected from CoO, NiO, $Cr_2O_3$, $Fe_2O_3$, $MnO_2$, and $V_2O_5$. The patent is primarily concerned with $V_2O_5$ which contributes to minimal distortion while giving a black aspect in reflection and a reddish brown tint in transmission. The Comte et al. compositions consist essentially, in weight percent, as calculated on the oxide basis, of:

| $SiO_2$ | 65–70 | $MgO + BaO + SrO$ | 1.1–2.3 |
|---|---|---|---|
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $2.8 Li_2O + 1.2 ZnO$ | >1.8 |
| | | 5.2 MgO | |

U.S. Pat. No. 5,179,045 (Aitken et al.) describes production of a burgundy color in a glass-ceramic having as its primary crystal phase a beta-quartz solid solution. The glass-ceramic contains up to 6% $TiO_2$ as a nucleating agent. It has a color package composed of 50–150 ppm $Co_3O_4$, 50–250 ppm NiO and 400–1000 ppm $Fe_2O_3$ to provide the desired burgundy color.

U.S. Pat. No. 5,256,600 (Pfitzenmaier) describes a method of varying the color in a glass-ceramic material having a beta-quartz solid solution as the predominant crystal phase. The method comprises controlling the $Al_2O_3$ level between 19 and 20% by weight, the $Fe_2O_3$ level between 700 and 900 ppm and the $Co_3O_4$ level at not over 15 ppm in the glass melt. $Co_3O_4$ may be added to the molten glass in the forehearth to provide an amber color with 20–40 ppm $Co_3O_4$ and a burgundy color with 120–140 ppm.

The present invention arose from a study directed at achieving greater utilization of the forehearth additive system in cookware design. In particular, the study was directed at determining what, if any, unique color effects might be obtained by varying the amount of cobalt oxide employed as a coloring additive in a precursor glass for $Li_2O$—$Al_2O_3$—$SiO_2$ glass ceramics.

SUMMARY OF THE INVENTION

The article of the invention is a colored glass-ceramic having a primary crystal phase selected from the group consisting of beta-quartz solid solution and beta-spodumene solid solution, containing an amount of $TiO_2$ effective as a nucleating agent up to 6% by weight, 700–900 ppm $Fe_2O_3$ and 550–3000 ppm $Co_3O_4$, the glass-ceramic having a beta-quartz solid solution as a primary crystal phase being transparent and having a color defined by the color coordinates $x=0.2200$–$0.3100$, $y=0.0200$–$0.2400$ falling within color box ABCDA in FIG. 1 in the drawings, and the glass-ceramic having a beta-spodumene solid solution as a primary crystal phase being opaque and having a color defined by the color coordinates $x=0.2480$–$0.2880$, $y=0.2000$–$0.3150$ falling within color box JKLMJ in FIG. 2 in the drawings.

The method of the invention comprises melting a $Li_2O$—$Al_2O_3$—$SiO_2$ glass capable of having a beta-quartz solid solution crystal phase thermally developed therein and containing an amount of $TiO_2$ effective as a nucleating agent up to 6%, 700–900 ppm $Fe_2O_3$ and 0–25 ppm $Co_3O_4$, adding, as a forehearth additive to the molten glass, a source of $Co_3O_4$ in an amount sufficient to provide a $Co_3O_4$ level of 550–3000 ppm in the glass, forming an article from the molten glass and heat treating the article at a sufficient temperature and for a sufficient time to develop a beta-quartz solid solution or a beta-spodumene solid solution crystal phase in the glass.

PRIOR ART

The patents noted in the Background section are believed to be the most relevant prior art.

DESCRIPTION OF THE INVENTION

Figure 1:
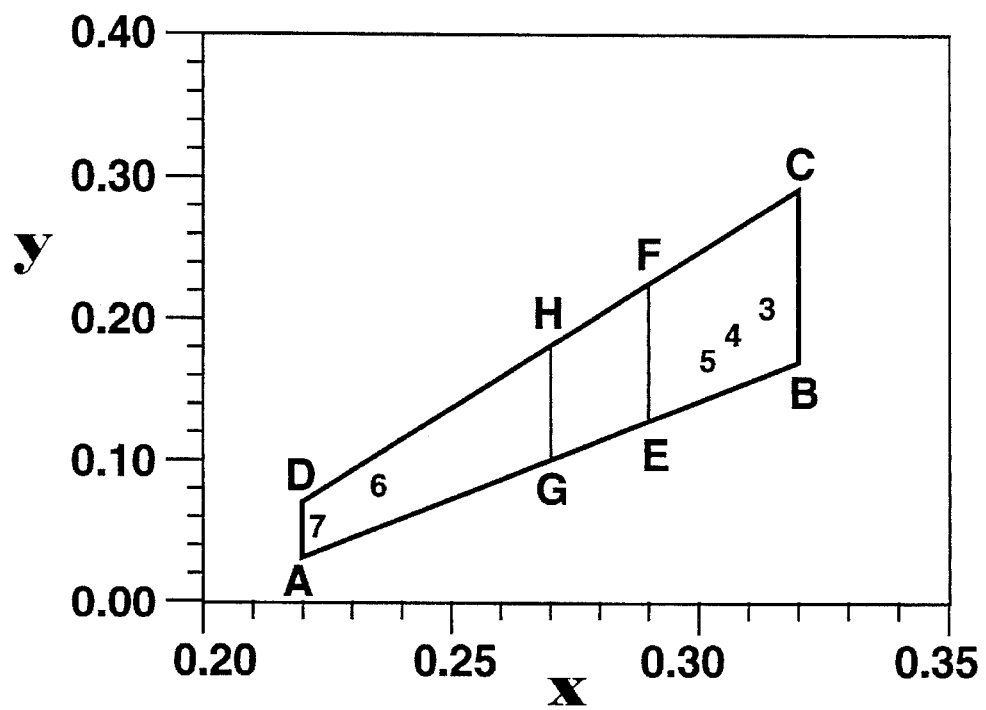
FIGS. 1 and 2 in the accompanying drawings are graphical representations of chromaticity coordinates x and y (Illuminant C). The FIGURES further show color coordinate boxes defining the regions in which different colors are achieved in accordance with the invention.

Our invention is based in large measure on our discovery that unique color effects can be obtained in transparent, beta-quartz solid solution and beta-spodumene solid solution glass-ceramics. The color effects are obtained by controlled additions of $Co_3O_4$ to the precursor glass for the glass-ceramic. One color of particular interest is a deep reddish-purple having the appearance of a rich plum color. This can be obtained in a transparent, beta-quartz solid solution glass-ceramic article.

The glass also contains up to 6% $TiO_2$ a as a nucleating agent. This, like the iron oxide, imparts an inherent brown color to the glass. $ZrO_2$ can be substituted to some extent, but tends to interfere with glass melting.

The preferred compositions of the invention, as expressed in percent by weight on an oxide basis, consist essentially of:

| | | | |
|---|---|---|---|
| $SiO_2$ | 65–70 | SrO | 0–1.4 |
| $Al_2O_3$ | 18–19.8 | BaO + SrO | 0.4–1.4 |
| $Li_2O$ | 2.5–3.8 | $As_2O_3$ | 0–1.5 |
| MgO | 0.5–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O + K_2O$ | 0–<1.0 |
| $ZrO_2$ | 1.0–2.5 | $Co_3O_4$ | 600–3000 ppm |
| BaO | 0–1.4 | $Fe_2O_3$ | 700–900 ppm |

The colorant may be introduced by incorporating components in their entirety in the batch fed to a melting unit. However, a real advantage is obtained by using a forehearth colorant additive system sometimes referred to as a colorcell.

The method and equipment used to add a colorant material to a molten glass in a forehearth are collectively referred to as a forehearth coloring system, or a colorcell. Such systems (colorcells) have been in use for at least 30 years. They have been used primarily, however, to impart colors to soda lime glasses, in particular, green or blue colors to soda lime glass bottles.

Currently, colorcells are employed to introduce two types of glass colorants: unmelted concentrated colorant in particulate form and melted color frits. The former is favored in the United States, while the latter is more popular in Europe. Recently, the colorcell practice has been particularly useful in simultaneously producing an opaque, white CORNING WARE product and a transparent product having added colorants, including $Co_3O_4$.

The presence of at least a few ppm of $Co_3O_4$, as a tramp impurity in other batch materials, is inevitable. However, an undesirable gray color is introduced into the white, opaque product with a $Co_3O_4$ level above about 10 ppm. Accordingly, it is desirable to maintain a low level in the glass tank. Then, the necessary $Co_3O_4$ level in the glass, together with other colorants for a colored glass-ceramic, can be achieved with a forehearth addition. Meanwhile the glass, as melted, is delivered from a second forehearth.

Both glass products are then cerammed, that is, heat treated to produce the desired glass-ceramic product. A typical schedule for a transparent, colored product is:

1. Raise furnace temperature to 800° C. at 300° C./hour.
2. Hold between 800° C. and 850° C. for 30 minutes.
3. Raise to 900° C. at 300° C./hour.
4. Hold for 45–60 minutes at 900° C.
5. Cool at furnace rate to ambient.

The low level, $Co_3O_4$ glass, that is, the precursor for the white, opaque product, is cerammed on the same schedule with one exception. That exception is that the temperature is raised to 1150° C., rather than 900° C., in the third step. This higher temperature treatment causes conversion of the beta-quartz crystals to beta-spodumene crystals, as well as crystal growth, thereby rendering the product opaque.

It is a particular feature of the present invention that opaque and transparent, glass-ceramic products having distinctly different colors may be obtained. This is accomplished while employing a common base glass, a single added colorant and different ceramming schedules. The color then depends on the amount of colorant (cobalt oxide)

added to the precursor glass, and whether the glass is cerammed to an opaque, or to a transparent product.

The distinctive color characteristics were initially observed in glass-ceramics prepared from a series of glass melts in crucibles. In preparing the glass batches, a single base glass composition was employed. Cobalt oxide was incorporated in this base glass in progressively increased amounts for each successive crucible melt.

The base glass composition in weight percent on an oxide basis was:

| | | | |
|---|---|---|---|
| $SiO_2$ | 68.3 | $TiO_2$ | 2.60 |
| $Al_2O_3$ | 19.55 | $ZrO_2$ | 1.70 |
| $Li_2O$ | 3.45 | $As_2O_3$ | 0.63 |
| MgO | 1.25 | $Fe_2O_3$ | 900 ppm |
| ZnO | 1.60 | $Co_3O_4$ | 22 ppm |
| BaO | 0.80 | | |

The progressive cobalt oxide additions are shown in TABLE I. Also shown are determinations of $Co_3O_4$ in the ultimate products. The determinations were made by X-ray fluorescence (XRF) measurements.

TABLE I

| Ex. | $Co_3O_4$ (calc) | $Co_3O_4$ (XRF) |
|---|---|---|
| 1 | 200 | 200 |
| 2 | 400 | 389 |
| 3 | 600 | 582 |
| 4 | 800 | 770 |
| 5 | 1000 | 965 |
| 6 | 2000 | 1940 |
| 7 | 3000 | 2930 |

The glass batches were mixed in 1200 gram lots and ballmilled for one hour. Each batch was melted in a platinum crucible placed in an electrically heated furnace for 16 hours at 1650° C. Each melt was poured into molds to form patties about 0.95 cms. (⅜") thick. The patties were annealed in an electric furnace operating at 700° C.

Two sets of samples were prepared for ceramming. Each sample was 0.64 cms. (¼") thick and polished on one surface. Each set included a sample prepared from each melt listed in TABLE I.

One set was cerammed in accordance with the schedule set forth above for a transparent product. The top temperature was 900° C. The other set was cerammed on the opaque, or beta-spodumene schedule. This had a top temperature of about 1150° C.

Color measurements were made in terms of x, y and Y coordinates employing the CIE chromaticity coordinate system based on Illuminant C. The results are recorded in TABLE II for the transparent set.

TABLE II

| Ex. | y | x | Y |
|---|---|---|---|
| 1 | 50.5 | 0.3339 | 0.3020 |
| 2 | 34.2 | 0.3246 | 0.2586 |
| 3 | 23.6 | 0.3133 | 0.2177 |
| 4 | 15.6 | 0.3099 | 0.1911 |
| 5 | 11.8 | 0.3082 | 0.1702 |
| 6 | 3.5 | 0.2406 | 0.0715 |
| 7 | 1.7 | 0.2219 | 0.0505 |

With respect to visual appearance, two areas of particular interest were observed. $Co_3O_4$ levels of about 550–850 parts per million (ppm), preferably about 750 ppm, provided a reddish-purple color that simulated a rich plum color. At higher $Co_3O_4$ levels, in particular above 1200 ppm, a deep violet color developed. A content of about 1500 ppm had a desirable color.

The data shown in TABLE II are plotted in FIG. 1 of the accompanying drawing. In FIG. 1, the x coordinates are plotted on the horizontal axis and the y coordinates are plotted on the vertical axis. The elongated polygon ABCDA encompasses coordinate value combinations that provide generally acceptable colors in accordance with the invention. These coordinate value combinations correlate with, and represent, transparent, beta-quartz solid solution glass-ceramics prepared from precursor glasses containing 600–3000 ppm cobalt oxide.

Within polygon ABCDA, glass-ceramics having color coordinate values to the right of dotted line EF, that is, within polygon EBCFE, generally provide a rich plum appearance. To the left of dotted line EF, the glass-ceramic colors take on a violet cast. Coordinate values to the left of dotted line GH are a distinctive dark violet.

TABLE III records the coordinates, as in TABLE II, measured on the opaque cerammed samples. All of these appear blue visually. The depth or intensity of the blue color increases as the cobalt oxide content increases.

TABLE III

| Ex. | y | x | Y |
|---|---|---|---|
| 1 | 67.1 | 0.3007 | 0.2990 |
| 2 | 59.9 | 0.2922 | 0.2865 |
| 3 | 54.7 | 0.2869 | 0.2770 |
| 4 | 50.8 | 0.2818 | 0.2696 |
| 5 | 47.7 | 0.2797 | 0.2640 |
| 6 | 38.4 | 0.2667 | 0.2423 |
| 7 | 32.1 | 0.2516 | 0.2225 |

Figure 2:
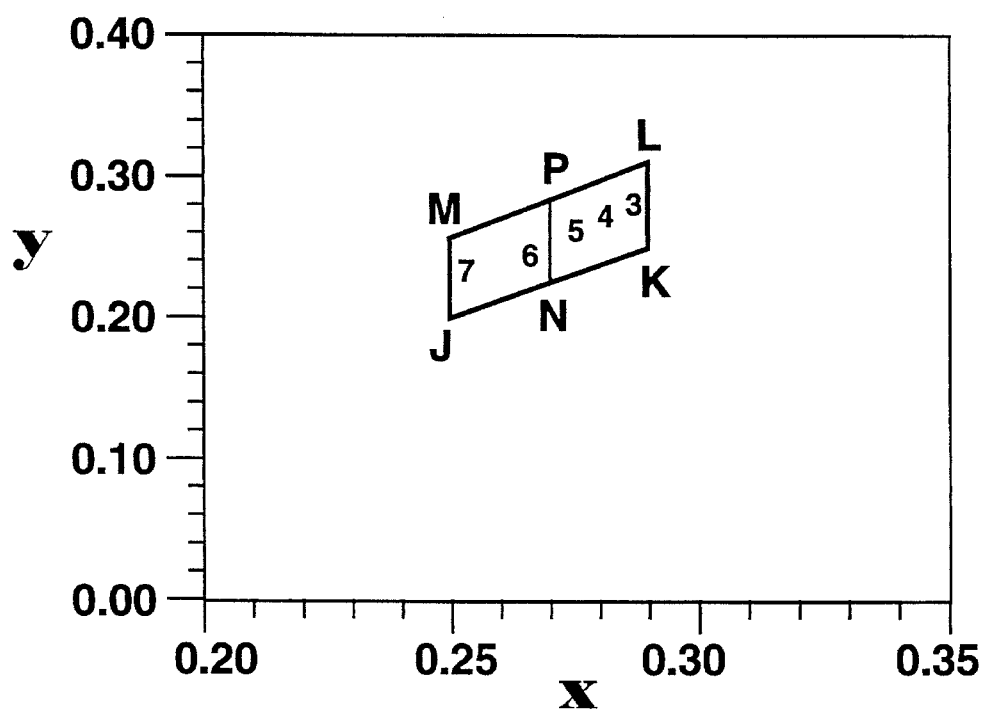

The data shown in TABLE III are plotted in FIG. 2 of the drawing. In FIG. 2, as in FIG. 1, the x coordinates are plotted on the horizontal axis and y coordinates on the vertical axis.

The elongated polygon JKLMJ encompasses coordinate value combinations of present interest in opaque, beta-spodumene glass-ceramics. From right to left in the diagram, the value combinations represent increasing amounts of cobalt oxide additions and blue colors of increasing intensity.

Glass-ceramics represented by color coordinate value combinations to the left of dotted line NP, that is, within polygon JNPMJ, are of particular interest because they exhibit a deep blue color. The particular color selected is a matter of design choice.

Following the crucible melt development, a commercial trial was scheduled during a melt transition. The base glass contained 22 ppm $Co_3O_4$, the level in a previously melted glass.

Arrangements were made to add cobalt oxide, as a forehearth addition, in increasing amounts ranging from 200 to 3000 ppm. The oxide was incorporated in a bonded oxide containing about 28% by weight cobalt oxide and supplied by the Ferro Corporation. Increasing amounts were provided by adding the bonded oxide at increasing rates.

A combination of equipment problems and a time constraint for use of a commercial unit shortened the run. Consequently, $Co_3O_4$ levels of 2000 and 3000 ppm had to be omitted. Glass samples were taken at hourly intervals for chemistry and infra-red measurements. Increasing cobalt oxide content decreases infra-red transmission, but this was not observed to seriously interfere with melting.

Samples were also taken hourly for subsequent ceramming in production facilities. One set of samples was cerammed to produce transparent glass-ceramics; a second set was cerammed to produce opaque glass-ceramics.

TABLE IV sets forth color coordinate data measured on samples taken hourly and cerammed to an opaque state. The x, y and Y values, as well as the $Co_3O_4$ content, are reported. TABLE V reports the same data measured on samples cerammed to a transparent state.

TABLE IV

| Time | $Co_3O_4$ (ppm) | Y | x | y |
|---|---|---|---|---|
| 8:30 | 170 | 68.4 | 0.3028 | 0.3042 |
| 9:30 | 290 | 61.1 | 0.2954 | 0.2935 |
| 10:30 | 450 | 55.6 | 0.2879 | 0.2826 |
| 11:30 | 550 | 53.2 | 0.2840 | 0.2773 |
| 12:30 | 650 | 51.2 | 0.2806 | 0.2727 |
| 13:30 | 850 | 47.8 | 0.2752 | 0.2652 |
| 14:30 | 960 | 46.0 | 0.2724 | 0.2609 |
| 15:30 | 1110 | 44.6 | 0.2703 | 0.2575 |
| 16:30 | 1450 | 42.7 | 0.2668 | 0.2510 |
| 17:30 | 1530 | 42.5 | 0.2665 | 0.2501 |

TABLE V

| Time | $Co_3O_4$ (ppm) | Y | x | y |
|---|---|---|---|---|
| 8:30 | 170 | 57.0 | 0.3296 | 0.3073 |
| 9:30 | 290 | 44.8 | 0.3252 | 0.2819 |
| 10:30 | 450 | 32.9 | 0.3161 | 0.2462 |
| 11:30 | 550 | 27.4 | 0.3113 | 0.2272 |
| 12:30 | 650 | 22.8 | 0.3053 | 0.2079 |
| 13:30 | 850 | 16.6 | 0.2957 | 0.1778 |
| 15:30 | 1110 | 10.8 | 0.2818 | 0.1422 |
| 16:30 | 1450 | 6.7 | 0.2650 | 0.1085 |
| 17:30 | 1530 | 6.1 | 0.2613 | 0.1019 |

As indicated, the commercial trial had to be cut short. Nevertheless, the data obtained showed very good correlation between samples generated in the crucible melts and samples generated in the commercial run.

We claim:

1. A colored glass-ceramic produced from a $Li_2O$—$Al_2O_3$—$SiO_2$ glass and having a primary crystal phase selected from the group consisting of beta-quartz solid solution and beta-spodumene solid solution, the glass-ceramic containing, as a color package, an amount of $TiO_2$ effective as a nucleating agent up to 6% by weight, 700–900 ppm $Fe_2O_3$ and 550–3000 ppm $Co_3O_4$, the glass-ceramic being transparent or opaque depending on the primary crystal phase, the glass-ceramic being transparent and having a color defined by the color coordinates x=0.2200–0.3100, y=0.0200–0.2400 falling within color box ABCDA in FIG. 1 in the drawings, when the primary crystal phase is a beta-quartz solution, and the glass-ceramic being opaque and having a color defined by the color coordinates x=0.2480–0.2880, y=0.2000–0.3150 falling within color box JKLMJ in FIG. 2 in the drawings when the primary crystal phase is a beta-spodumene solid solution.

2. A glass-ceramic in accordance with claim 1 wherein the glass-ceramic is transparent and the primary crystal phase is beta-quartz solid solution.

3. A transparent glass-ceramic in accordance with claim 2 wherein the $Co_3O_4$ content is 550–850 ppm and the glass-ceramic exhibits a plum color defined by color coordinates falling within polygon EBCFE in FIG. 1.

4. A transparent glass-ceramic in accordance with claim 2 wherein the $Co_3O_4$ content is greater than about 1200 ppm and the glass-ceramic exhibits a deep violet color defined by color coordinates falling within polygon AGHDA in FIG. 1.

5. A glass-ceramic in accordance with claim 1 wherein the glass-ceramic is opaque, the primary crystal phase is a beta-quartz solid solution and the glass-ceramic exhibits a blue color having color coordinates falling within polygon JKLMJ in FIG. 2.

6. An opaque glass-ceramic in accordance with claim 5 wherein the $Co_3O_4$ content is greater than about 1000 ppm and the glass-ceramic exhibits a dark blue color defined by color coordinates falling within polygon JNPMJ in FIG. 2.

7. A colored glass-ceramic having a primary crystal phase selected from the group consisting of beta-quart solid solution and beta-spodumene solid solution, the glass-ceramic being transparent or opaque depending on the primary crystal phase, the glass-ceramic being transparent having a color defined by the color coordinates x=0.2200–0.3100, y=0.0200–0.2400 falling within the color box ABCDA in FIG. 1 in the drawings, when the primary crystal phase is a beta-quartz solid solution, and the glass-ceramic being opaque and having a color defined by the color coordinates x=0.2480–0.2880, y=0.2000–0.3150 falling within color box JKLMJ in FIG. 2 in the drawings when the primary crystal phase is a beta-spodumene solid solution, the glass-ceramic consisting essentially of, as calculated in weight percent on an oxide basis:

| | | | |
|---|---|---|---|
| $SiO_2$ | 65–70 | SrO | 0–1.4 |
| $Al_2O_3$ | 18–19.8 | BaO + SrO | 0.4–1.4 |
| $Li_2O$ | 2.5–3.8 | $As_2O_3$ | 0–1.5 |
| MgO | 0.5–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O + K_2O$ | 0–<1.0 |
| $ZrO_2$ | 1.0–2.5 | $Co_3O_4$ | 600–3000 ppm |
| BaO | 0–1.4 | $Fe_2O_3$ | 700–900 ppm. |

8. A glass-ceramic in accordance with claim 7 consisting of, as calculated in approximate weight percent on an oxide basis:

| | | | |
|---|---|---|---|
| $SiO_2$ | 68.3 | $ZrO_2$ | 1.7 |
| $Al_2O_3$ | 19.55 | BaO | 0.8 |
| $Li_2O$ | 3.45 | $As_2O_3$ | 0.63 |
| MgO | 1.25 | $Co_3O_4$ | 750 ppm |
| ZnO | 1.6 | $Fe_2O_3$ | 900 ppm. |
| $TiO_2$ | 2.6 | | |

9. A method of producing a colored glass-ceramic article comprising melting a $Li_2O$—$Al_2O_3$—$SiO_2$ glass capable of having a beta-quartz solid solution crystal phase or a beta-spodumene solid solution crystal phase thermally developed therein and containing an amount of $TiO_2$ effective as a nucleating agent up to 6%, 700–900 ppm $Fe_2O_3$ and 0–25 ppm $Co_3O_4$, adding, as a forehearth additive to the molten glass, a source of $Co_3O_4$ in an amount sufficient to provide a $Co_3O_4$ level of 550–3000 ppm in the glass-ceramic article, forming an article from the molten glass and heat treating the article at a sufficient temperature and for a sufficient time to develop a beta-quartz solid solution or a beta-spodumene solid solution crystal phase in the glass.

10. A method in accordance with claim 9 which comprises adding $Co_3O_4$ in an amount to provide a level of 550–850 ppm in the glass.

11. A method in accordance with claim 10 which comprises heat treating the glass at a top temperature of about 900° C. for a sufficient time to develop a beta-quartz solid solution crystal phase.

12. A method in accordance with claim 9 which comprises adding $Co_3O_4$ in an amount to provide a level of $Co_3O_4$ greater than about 1000 ppm in the glass.

13. A method in accordance with claim 12 which comprises heat treating the glass at a top temperature of about 900° C. for a sufficient time to develop a beta-quartz solid solution crystal phase.

14. A method in accordance with claim 12 which comprises heat treating the glass at a top temperature of about 1150° C. for a sufficient time to develop a beta-spodumene solid solution crystal phase.

\* \* \* \* \*